United States Patent [19]

Wilkie

[11] Patent Number: 5,489,473
[45] Date of Patent: Feb. 6, 1996

[54] BIAXIALLY AND MONOAXIALLY ORIENTED POLYPROPYLENE COLD SEAL RELEASE FILM

[75] Inventor: Andrew F. Wilkie, Haverhill, Mass.

[73] Assignee: Borden, Inc., Columbus, Ohio

[21] Appl. No.: 224,229

[22] Filed: Apr. 7, 1994

[51] Int. Cl.$^6$ .................. B32B 27/32; B32B 31/16; B65H 39/00
[52] U.S. Cl. .................. 428/323; 428/349; 428/447; 428/516; 428/910; 270/52
[58] Field of Search .................. 428/349, 447, 428/516, 910, 323; 270/52

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka | 428/220 |
| 4,348,457 | 9/1982 | Rosenthal et al. | 428/516 |
| 4,357,383 | 11/1982 | Howden et al. | 428/213 |
| 4,692,380 | 9/1987 | Reid | 428/349 |
| 4,741,950 | 5/1988 | Liu et al. | 428/315.5 |
| 4,758,396 | 7/1988 | Crass et al. | 264/145 |
| 4,777,081 | 10/1988 | Crass et al. | 428/215 |
| 4,997,700 | 3/1991 | Bothe et al. | 428/216 |
| 5,026,592 | 6/1991 | Tanocha et al. | 428/204 |
| 5,091,236 | 2/1992 | Keller et al. | 428/213 |
| 5,194,318 | 3/1993 | Milloring et al. | 428/215 |

OTHER PUBLICATIONS

Tech. Info. Bulletin FC–25B of Hercules, Inc. for Hercules WTF 503.
Spec. Sheet for Opptwrap Ohctw of Borden, Inc.
Spec. Sheet for CCO Two–Sided Modified OPP Film of Borden, Inc.

Primary Examiner—P. C. Sluby
Attorney, Agent, or Firm—Kenneth P. Van Wyck; George P. Maskas; Dennis H. Rainear

[57] ABSTRACT

The invention presents a new use for modified polypropylene films, wherein the films are cold sealable for heat sensitive packaging operations. In a preferred embodiment, the film comprises a laminate having at least one cold seal release layer and a cold seal receptive layer such that when the release layer is adjacent a cold seal cohesive on the cold seal receptive layer, the release layer and the cold seal receptive layer exhibit remarkably low adhesion. Typical cold seal materials include natural and synthetic rubber latex cohesives.

22 Claims, 2 Drawing Sheets

BIAXIALLY AND MONOAXIALLY ORIENTED POLYPROPYLENE COLD SEAL RELEASE FILM

TECHNICAL FIELD

The invention relates to a polypropylene laminate or composite film structure for packaging, said laminate film structure having improved cold seal release properties. The film laminate comprises a cold seal receptive surface and a cold seal release skin layer. The laminated composite film thus produced, in the presence of a cold seal cohesive, can be wound into a roll and such cold seal cohesive will exhibit excellent release properties from such cold-seal release surface.

BACKGROUND ART

Cold seal cohesives are generally natural or synthetic rubber latex compounds which when applied to the cold seal receptive surface of a flexible packaging substrate allow the package to be cohesively sealed by pressure and adequate dwell time at ambient temperatures. By "cold seal" herein is meant the sealing or bonding of two film layers to each other at a temperature of less than about 150° F. Cold seal latexes are particularly useful in wrapping products which are heat sensitive, such as confectioneries. Cold seal cohesives are generally applied to the inside (cold seal receptive surface) of a film lamination. They may also be applied to a single web film provided that the surface is previously primed or printed. In each case, the outer film surface (facing away from the cold seal) must repel adhesion to the cold seal on the inner web in order that the roll stock may be unwound when it is used to wrap the product. In the case of the single web film, the surface opposing the cold seal is typically coated with an overlacquer (polyamide type) in order to provide sufficient release from the cold seal, i.e., prevent roll blocking. In the case of lamination, the outer web film is generally modified with migratory additives which when sufficiently bloomed to the surface promote low co-efficient of friction (C.O.F.) for machinability and cold seal release (C.S.R.). It is known from the art that certain migratory additives of a laminate film, particularly amides, coming in intimate contact with the cold seal surface would into a roll in sufficient quantities, will cause the cold seal cohesive strength to become significantly weakened. This phenomenon is known in the trade as cold seal deadening.

Biaxially oriented polypropylene (B.O.P.P.) film by itself does not give adequate cold seal release (C.S.R.) or coefficient of friction (C.O.F.) and requires the addition of additives to accomplish these objectives. These additives, which are predominantly migratory, have two main problems: (1) they must bloom to the film's surface and remain there in order to be consistently effective; and (2) they have a tendency to retard the cold seal cohesive strength. The current industry standard film for this application is a mono-layer B.O.P.P. (homopolymer amide modified) film from Hercules, Inc. designated B523 or B522. In the case of B523, the slip modified film is corona discharge treated to an equal level on both surfaces and, as such, can be used on either side for printing and laminating. In the case of B522, the film is corona discharge treated on only one side and therefore can only be printed and laminated on that surface. The untreated surface is the preferred surface for cold seal release. These films, however, need to be aged for a period of time after production at a certain temperature so that the cold seal release and C.O.F. additives sufficiently bloom to the surface for the film to be functional.

The main requirements for a monoaxially oriented or a B.O.P.P. cold seal release film include: (a) good cold seal release; (b) good anti-blocking to reverse printed inks; (c) good lamination bonds to inks and adhesives on the non-release surface; (d) good and stable optics (i.e., haze/gloss); (e) good and stable C.O.F.; and (f) minimal/no effect on cold seal cohesiveness in the finished structure.

U.S. Pat. No. 4,230,767 issued Oct. 28, 1980 to Isaka, et al. teaches a multi-layer propylene polymer film for sealing packages. However, the Isaka, et al. laminated film is a heat sealable material and Isaka does not teach cold seal release properties.

It is therefore desirable to have a B.O.P.P. film for packaging purposes which is useable in cold sealable applications and which exhibits the requirements described above.

BRIEF DISCLOSURE OF INVENTION

The invention is related to a new use of a laminate film, said new use being cold seal release of said film. The invention is also related to a monoaxially oriented or a B.O.P.P. film with good to excellent cold seal release properties achieved without the use of migratory additives. The cold seal release film of the present invention is produced by co-extruding a relatively thin surface skin layer on a body or core layer of homopolymer polypropylene. The skin layer comprises a low ethylene content polybutylene copolymer at 20–50 weight percent melt blended with an ethylene propylene random copolymer at 50–80 weight percent. This combination of polymers surprisingly provides significantly better cold seal release (with or without corona treatment) than the release obtained using homopolymer polypropylene or ethylene-propylene random copolymers which do not contain surface migratory additives. Oriented polypropylene films having similar composition have been known in the art, but only for use as a heat sealable surface and are only sealable when not corona treated. Corona discharge treating the surface of the present film substantially diminishes the heat sealing temperature use range, however, the cold seal release properties remain excellent. By "heat seal" herein is meant temperatures generally in excess of 150° F., and more commonly in the range of 200° to 300° F. For many packaging operations, such temperatures are unacceptable.

The inventive cold seal release laminate film demonstrates: (a) good to excellent cold seal release; (b) good anti-blocking characteristics; (c) excellent optics; (d) good lamination/ink bonds; and (e) does not poison or deaden the cold seal cohesive properties on the reverse surface of the laminate structure.

The film-to-film and film-to-metal C.O.F. of the release surface of the materials of the present invention are moderately high and can benefit from the addition of 0.01 to 1.0 weight percent of a non-migratory inorganic slip agent, such as cross-linked silicone and/or other inorganics. Such non-migratory slip agents useful herein can include talcs, syloids, glass beads, diatomaceous earth, clay and the like. A preferred agent is Kaolin clay. To enhance the present invention, relatively minor amounts of migratory slip/anti-block and anti-static agents, such as amides, stearates and amines can optionally be added to the skin and/or core layers to facilitate the main film functions. The preferred amounts of such agents is 0 to about 1.0 weight percent. The use of these additives, however, is limited by the propensity to deaden the cold seal in the end use application.

The materials of the present invention have five main advantages over the prior art B.O.P.P. films for C.S.R. These include: (1) immediate and permanent cold seal release properties (i.e., no film aging (blooming) is required) at the time of manufacture; (2) permanently low C.O.F. due to its non-migratory skin layer slip package; (3) the release film will not deaden the cold seal because it does not possess migratory additives in type or quantity to do so; (4) the release surface may be corona discharge treated or non-treated, depending on the application, without significantly effecting cold seal release; and (5) the non-treated surface will readily accept code dating inks.

DETAILED DESCRIPTION

Figure 1:
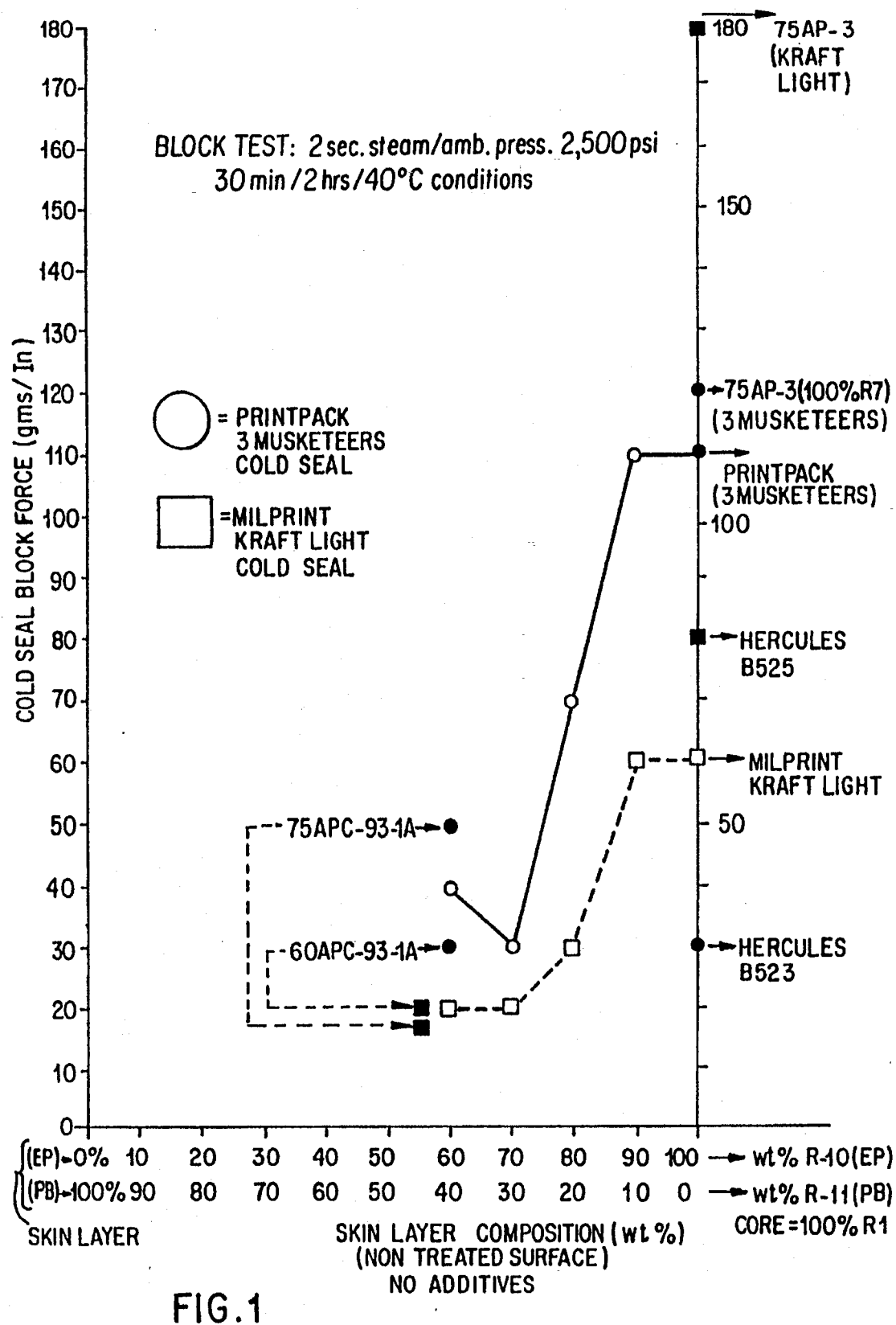
FIG. 1 presents cold seal block force release values.

The preferred B.O.P.P. cold seal packaging films of the present invention are laminated films comprising at least one cold seal release layer and a cold seal receptive layer. The cold seal release skin layer or layers can have a gauge of 2–10 and comprise 50–80 weight percent of an ethylene-propylene random copolymer (2–6% ethylene). The remaining 50–20 weight percent of the C.S.R. skin layer is a polybutylene-ethylene copolymer, wherein the ethylene content is preferably about 0.5 to 2.5 weight percent. The C.S.R. skin layer also contains a cross-linked silicone at a level of from about 1,000 parts per million up to about 10,000 parts per million. The C.S.R. skin layer also optionally contains kaolin clay at levels of from 0 up to about 10,000 parts per million.

The core layer of the films of the present invention can comprise 40 to 200 gauge homopolymer isotactic polypropylene, ethylene-propylene random copolymer, and/or ethylene-propylene block copolymer. In addition, the core layer can optionally contain 0 to about 5 weight percent of high density polyethylene and various additives, such as amides, including erucamide, behenamide or glycerol monostearate, or amines. Other inorganics, calcium stearate, or silicone oil can also be added to the core layer, but these are often more useful when used within the skin layer. The core layer, if desired, may also be corona discharge treated, or flame treated.

Thus, the present invention is directed to a packaging laminate film having excellent cold seal release packaging properties, which comprises a core layer selected from the group consisting of homopolymer isotactic polypropylene, ethylene-propylene random copolymer, and ethylene-propylene block copolymer, and a cold seal release skin layer comprising 50 to 80 weight percent of ethylene-propylene random copolymer, wherein the ethylene content of the random copolymer is 2 to 6 weight percent, and wherein the skin layer further comprises 20 to 50 weight percent of a polybutylene-ethylene copolymer, wherein the ethylene content is about 0.5 to 2.5 weight percent.

The invention is further directed to a method of using a laminate film wherein said film comprises a core layer selected from the group consisting of homopolymer isotactic polypropylene, ethylene-propylene random copolymer, and ethylene-propylene block copolymer, and a cold seal release skin layer comprising 50 to 80 weight percent of ethylene-propylene random copolymer, wherein the ethylene content of the random copolymer is 2 to 6 weight percent, and wherein the skin layer further comprises 20 to 50 weight percent of a polybutylene-ethylene copolymer, wherein the ethylene content is about 0.5 to 2.5 weight percent.

It is surprising and unexpected that co-extruded B.O.P.P. film surface previously used exclusively for heat sealing packaging applications can, by the present invention, be utilized in cold seal applications bearing desirable release properties to such cohesives. The coextruded polypropylene films of the present invention, when utilized in cold seal laminate applications, exhibit excellent cold seal release to commercially applied cold seals. Release is immediate from the date of manufacture, without aging, and remains permanent and consistent through aging. Unlike prior art films, no additive migration is necessary to achieve desired release. In fact, migratory release additives are not required in the present cold seal invention, but are preferred. Additionally, good anti-block to reverse printed inks and good ink adhesion and lamination bond strengths on the treated core layer print or laminating surface are obtained by the present invention. In addition, according to the present invention, minimal to zero cold seal deadening in the final film is observed.

The cold sealing process of the present invention is preferably achieved at a temperature of less than 150° F. and a more preferred temperature range is from 65° F. to 85° F. In the cold sealing process of the present invention, the laminate films with cohesive layer pattern cold seal described herein are subjected to sufficient pressure and for sufficient time to achieve the desired cold seal strength. The time needed for pressure application to achieve cold sealing can be from 0.1 to 1 second, but these times are not limitations of the present invention. In one embodiment, the cold seal pressure can be from about 20 to 100 psi, and more preferably is from 70 to 90 psi.

The resulting cold sealed laminate films of the present invention preferably exhibit a release force of from about zero to about 75 grams/inch, but 5 to 50 grams/inch is preferred.

TABLE 1

| BOPP Film Type | Block Force[1] (Cold Seal Release) gms/in. width | Comments |
| --- | --- | --- |
| Hercules 75 g B523 | 25 | Competitive fully bloomed/ aged state of the art mono-layer film, corona treated surface, at least 2 years old. |
| 70 g Proponite CSX | 15 | Inventive film (no migratory additives) non-corona treated surface. |
| 75 g Proponite AP-1 | 60 | Coextruded, corona treated ethylene propylene copolymer surface, not fully bloomed. |
| 75 g Proponite AP-1 | 5 | Same as above except fully bloomed, additive package aged 4 months @ 40° C. |
| 75 g Proponite A | 90 | Coextruded slip modified, corona treated surface, homopolymer polypropylene film. |

[1]Commercial Three Musketeers cold seal lamination Block conditions: 2 sec. moisture/ambient temp./100 psi. load, 2 hrs./40° C., 1 lb. load?

TABLE 2

Block Force (gms/inch width) commercial Kraft 16 slice American singles
Cold Seal Lamination

| Film Type | Aging Condition of Film | | | |
|---|---|---|---|---|
| | 1 Day Ambient | 7 Days Ambient | 1 Day 40° C. | 5 Days 40° C. |
| Hercules 75 g B523 2+ years old) | 50 | 50 | 60 | 40 |
| Proponite 75 g AP-3 coextruded, corona treated, slip modified commercial BOPP | 120 | 120 | 45 | 15 |
| Proponite 75 g[1] inventive film APC-93-1A | | | | |
| non-treated surface | 35 | 25 | 15 | 15 |
| treated surface | 25 | 35 | 25 | 10 |
| Proponite 75 g[2] inventive film, homopolymer polypropylene surface, treated | 160 | 150 | 140 | 45 |

[1] Skin Layer: 5.5 gauge
- 60% 5% $C_2$ EP random copolymer
- 40% polybutylene
- 3,000 ppm high density polypropylene
- 5,000 ppm calcium stearate
- 2,500 ppm stearamide
- 1,500 ppm kaolin clay
- 2,000 ppm 3μ crone linked silicone Core Layer: 69.5 gauge
- 99.1% isotatic homopolymer polypropylene
- 1,000 ppm high density polyethylene
- 3,500 ppm stearamide
- 3,500 ppm behenamide
- 1,000 ppm erucamide

[2] Skin Layer: 4 gauge
- 97% homopolymer polypropylene
- 3% high density polyethylene
- 2,000 ppm 2μ cross linked silicone
- 3,000 ppm erucamide
- 7,000 ppm behenamide Core Layer: 71 gauge
- 99.2% isotatic homopolymer polypropylene
- 1,000 ppm erucamide
- 7,000 ppm behenamide

TABLE 3

| Film Type | Aged Condition | Cold Seal Block Force (gms/inch width) | | Comments |
|---|---|---|---|---|
| | | Kraft 16 slice Am. Singles Cold Seal | M & M/ Mars Twix Cold Seal | |
| 100 g APC-93-1A | Ambient 2 days | 25 | 25 | Inventive film surface corona treated |
| 100 g APC-93-1A | Ambient 2 days | 15 | 15 | Inventive film surface untreated |
| Hercules B523 | Ambient 2+ years | 55 | 20 | Competitive state of the art, fully aged film corona treated |
| Hercules B523 (4/91) [alcohol wiped 10 × to remove amides] | Ambient 2+ years | 140 | 70 | competitive state of the art film with surface amides removed |
| Mobil LCM-W | Ambient 1+ year | 150 | 80 | Competitive slip film corona treated |
| Mobil LCM-W [alcohol wiped 10 × to remove amide] | Ambient 1+ year | 120 | 75 | competitive slip film untreated surface |
| Commercial front of Kraft lamination (Borden 75 g AP-1) | Ambient <4 mos. | 140 | — | Commercially acceptable lamination |
| Commercial front of M & M/Mars | Ambient 3 mos. | — | 70 | Commercially acceptable lamination |

TABLE 3-continued

| | | Cold Seal Block Force (gms/inch width) | | |
|---|---|---|---|---|
| Film Type | Aged Condition | Kraft 16 slice Am. Singles Cold Seal | M & M/ Mars Twix Cold Seal | Comments |
| Twix Lamination (Borden 100 g AP-1) | | | | |

EXAMPLE 1

Example 1 is illustrated in Table 1 which shows the excellent cold seal release properties of the films of the present invention. The film, a 70 gauge Borden Proponite film product, contains essentially no migratory additives associated with cold seal release. This is cold seal laminated to a commercial M&M/Mars Three Musketeers film, which, as such, is the prime example of the skin layer composition of ethylene propylene copolymer and ethylene polybutylene copolymer showing its inventive C.S.R. property. This laminated composite film is a B.O.P.P. product with the surface being non-treated and heat sealable. The state of the art film, a conventional 75 gauge Hercules B523, also shows excellent C.S.R in Table 1. However, the Hercules film represents the optimum performance for a film containing a fully matured migratory additive package. The Hercules film showed a block force reading of cold seal release of 25 grams per inch width, while a standard 70 gauge Borden Proponite C.S.X. film surface, non-corona treated, and comprising no migratory additives, exhibited a more desirable block force cold seal release measurement of only 15 grams per inch width. Further, a 75 gauge Borden Proponite AP-1 film with a fully bloomed additive package showed excellent C.S.R. value of 5 grams per inch width, a value clearly superior to the value exhibited by the Hercules B523 film. Also included in Table 1 is a standard slip-modified, corona treated homopolymer 75 gauge Borden Proponite A film. This film demonstrated the deficiency of a homopolymer surface with an insufficient migratory additive package for C.S.R. yielding an undesirably high block force cold seal release value of 90 grams per inch width.

EXAMPLE 2

Example 2, illustrated in Table 2, shows data on a production film specially produced for cold seal applications. The example shows that the B.O.P.P. film has immediately good C.S.R. without the need for migratory additives to be bloomed to the surface. The conventional Hercules B523 film shows moderately good C.S.R. to a commercial cold seal lamination which does not improve upon heat aging the film. This demonstrates that the competitive Hercules film has a fully mature additive package. The cold seal inventive film, a Borden Proponite 75 gauge APC-93-1A, is presented in Table 2 for both corona-treated and non-corona-treated samples. These films also contain an additional, but not essential, migratory additive package. However, the cold seal films of the present invention demonstrate good to excellent C.S.R. immediately without the need for migratory additives to be fully bloomed. There is a slight improvement in C.S.R. with heat aging. Both treated and non-treated surfaces are shown to be effective for cold sealing in this example.

EXAMPLE 3

Example 3, illustrated in Table 3, shows the results of cold seal block force testing of films of a different gauge. The films of Example 3 include the inventive film formulation APC-93-1A and two different commercial cold seal films. The C.S.R. surface of the inventive film is corona-treated to a minimum level and shows excellent immediate C.S.R. to both cold seals, that is, a value of 25 grams per inch on the cold seal test and 25 grams per inch on the M&M/Mars Twix cold seal test. The same film without corona treatment exhibited even lower cold seal block force values of 15 grams per inch for both tests. The Hercules B523 film also shows good to excellent C.S.R. to both cold seals, however, after wiping the film surface with a solvent to substantially remove the bloomed surface additives, the C.S.R. properties of the Hercules B523 film became significantly impaired. This condition represents Hercules B523 when it is not fully aged. It also represents a case where the surface additives are driven back into the film through processing thereby negatively affecting both C.S.R. and C.O.F. This phenomenon has been reported by converters and is considered a negative feature of the prior art film.

EXAMPLE 4

Example 4, illustrated in FIG. 1, compared B.O.P.P. films where the concentration of the ethylene propylene random copolymer was varied from 60–90 weight percent and the ethylene polybutylene copolymer component was varied from 10–40 weight percent. These inventive films contained no additives of any kind and the film surfaces were not corona treated. Two commercial cold sealed film structures were used to measure C.S.R. The results indicated that good C.S.R. was achieved when the level of polybutylene copolymer was greater than 10 weight percent and preferably greater than 20 weight percent. Specifically, for a 75 gauge B.O.P.P. film of the present invention with 60 weight percent ethylene propylene random polymer and 40 weight percent polybutylene copolymer, a C.S.R. value of 50 grams per inch cold seal block force was obtained. On a 60 gauge B.O.P.P. film of the present invention, also bearing 60 weight percent ethylene propylene random copolymer and 40 weight percent polybutylene copolymer, a cold seal block force measurement of about 30 grams per inch was obtained. These values were obtained for the Three Musketeer cold seal test. Cold seal block force values for the preceding films were each 20 grams per inch. These values compare quite favorably to, or are better than, the values obtained for Hercules B523.

EXAMPLE 5

Figure 2:
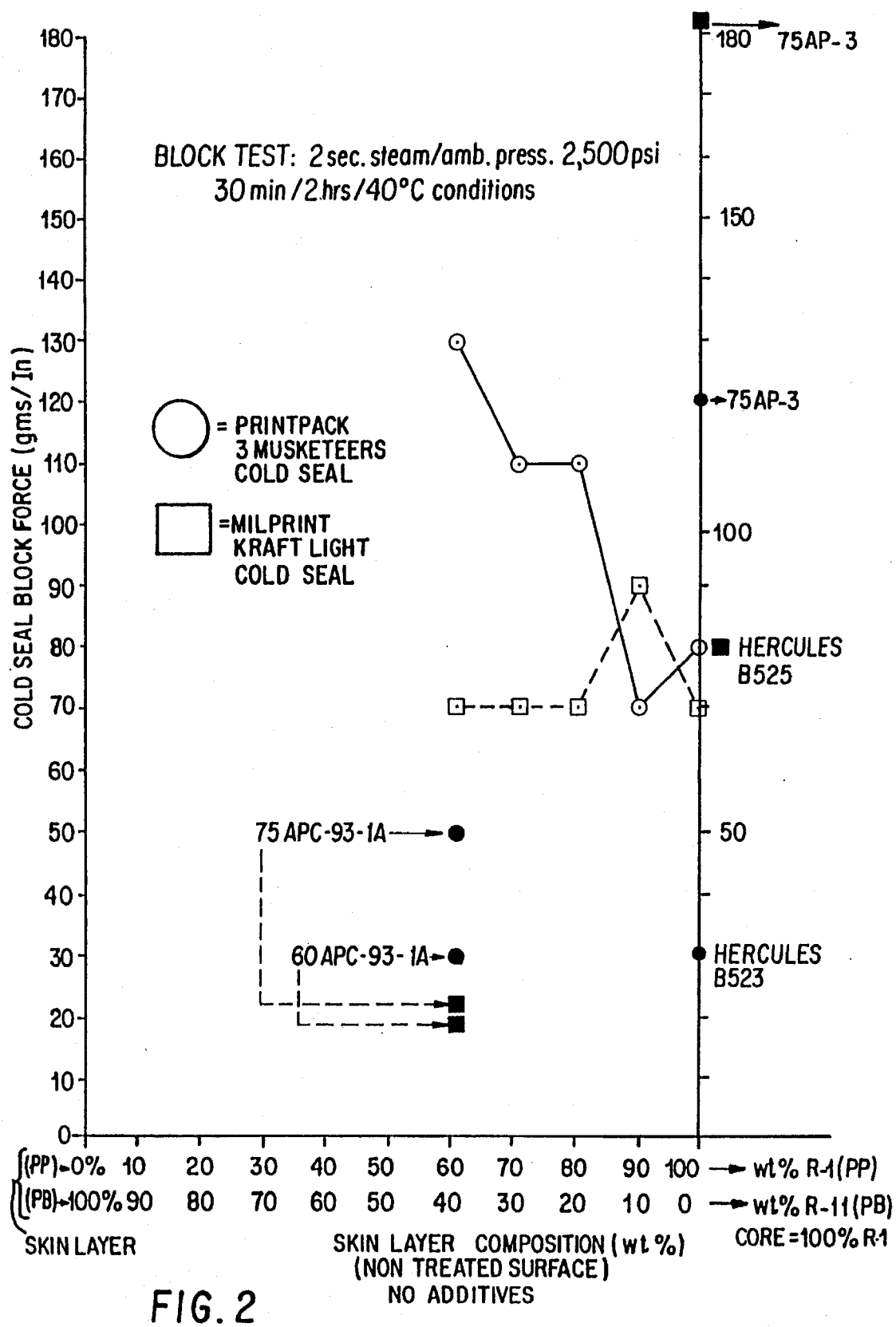
FIG. 2 presents cold seal block force release values.

Example 5, illustrated in FIG. 2, demonstrated cold seal block force test measurements in grams per inch comparing Hercules B523 film to two cold seal films of the present invention, 75 gauge and 60 gauge. The tests were run on 3 Musketeers cold seal and Kraft Light cold seal. The Hercules prior art film had a cold seal test value of 30 grams per inch, as did the inventive 60 gauge film. The Kraft Light cold seal test value for both 75 and 60 gauge inventive film was significantly lower, exhibiting values of 20 grams per inch.

While certain preferred embodiments of the present invention have been disclosed in detail, it is to be understood that various modifications may be adapted without departing from the spirit of the invention or scope of the following claims.

That which is claimed is:

1. A component of a packaging laminate film, said component having improved cold seal release properties, which comprises a core layer selected from the group consisting of homopolymer isotactic polypropylene, ethylene-propylene random copolymer, and ethylene-propylene block copolymer, and a cold seal release layer on one side of said core, said laminate having a cold seal cohesive on an outer surface of said laminate on a side of the core opposite said cold seal release layer, wherein said cold seal release layer comprises 50 to 80 weight percent of ethylene-propylene random copolymer, wherein the ethylene content of the random copolymer is 2 to 6 weight percent, and wherein the cold seal release layer further comprises 20 to 50 weight percent of a polybutylene-ethylene copolymer, wherein the ethylene content in the polybutylene-ethylene copolymer is about 0.5 to 2.5 weight percent.

2. The component of claim 1 which is cold sealable at a temperature of less than about 150° F.

3. The component of claim 1 wherein the film is a monoaxially oriented film.

4. The component of claim 1 wherein the film is a biaxially oriented film.

5. The component of claim 1 wherein at least one side of the film has been corona discharge treated.

6. The component of claim 1 further comprising a non-migratory inorganic slip agent in the skin layer in an amount of 0.1 to 1.0 weight percent.

7. The component of claim 1, said film being an extruded film which exhibits immediate and permanent cold seal release properties without aging of said film.

8. The component of claim 1, wherein the skin layer further comprises Kaolin clay at levels up to about 10,000 parts per million.

9. The component of claim 1 in the form of roll stock wherein said at least one cold seal release layer is wound so as to be adjacent a cold seal cohesive on said laminate.

10. The component of claim 1 wherein the ethylene content is about 0.5 percent by weight.

11. A method of packaging an article, said method comprising providing, as roll stock, a laminate film wherein said film comprises a core layer selected from the group consisting of homopolymer isotactic polypropylene, ethylene-propylene random copolymer, and ethylene-propylene, ethylene-propylene block copolymer, and a cold seal release skin layer comprising 50 to 80 weight percent of ethylene-propylene random copolymer, wherein the ethylene content of the random copolymer is 2 to 6 weight percent, and wherein the skin layer further comprises 20 to 50 weight percent of a polybutyleneethylene copolymer, wherein the ethylene content is at least about 0.5 weight percent, said skin layer, when in roll stock form, being adjacent a cold seal cohesive, wherein said method comprises the steps:

(a) unrolling the laminate film, (b) positioning the laminate film around an article to be packaged, wherein the cold seal cohesive of the film at least partially overlaps itself;

(c) applying sufficient pressure to the overlapped portion of the film at a temperature below about 150° F. to thereby seal said film to itself.

12. The method of claim 9 whereby the cold seal release skin layer of said film, when contacted with the cold seal cohesive exhibits a release force of 5 to 50 grams per inch.

13. The method of claim 4 wherein the film is a monoaxially oriented film.

14. The method of claim 11 wherein the film is a biaxially oriented film.

15. The method of claim 11 wherein at least one side of the film has been corona discharge treated.

16. The method of claim 11 wherein the film further comprises a non-migratory inorganic slip agent in an amount of 0.1 to 1.0 weight percent.

17. The method of claim 11 wherein the film is an extruded biaxially oriented film which exhibits immediate and permanent cold seal release properties without aging of the film.

18. The method of claim 11 wherein the skin layer of the film further comprises Kaolin clay at levels up to about 10,000 parts per million.

19. The method of claim 11 wherein the pressure applied to cold seal the film is from 60 to 100 psi.

20. The method of claim 11 wherein the film does not contain migratory release additives.

21. The method of claim 11 wherein zero cold seal deadening in the final film is observed.

22. The method of claim 11 wherein the ethylene content is about 0.5 to 2.5 percent by weight.

* * * * *